United States Patent [19]
Ruizzo, Jr.

[11] 4,308,847
[45] Jan. 5, 1982

[54] COMBUSTION DEVICE FOR IC ENGINE

[76] Inventor: Gladio Ruizzo, Jr., 200 Windmill St., Providence, R.I. 02904

[21] Appl. No.: 96,999

[22] Filed: Nov. 23, 1979

Related U.S. Application Data

[63] Continuation-in-part of Ser. No. 863,787, Dec. 23, 1977, abandoned.

[51] Int. Cl.³ .......................................... F02M 25/06
[52] U.S. Cl. .................................... 123/573; 123/536
[58] Field of Search ............... 123/572, 573, 536, 537, 123/574

[56] References Cited

U.S. PATENT DOCUMENTS 3,059,910 10/1962 Moriya .............................. 123/536
3,989,017 11/1976 Reese ................................ 123/572

*Primary Examiner*—Ronald H. Lazarus
*Attorney, Agent, or Firm*—Robert J. Doherty

[57] ABSTRACT

A device for disposition in a loop for transporting gaseous material between the crankcase and the intake of the carburetor of an IC engine at a location downstream from the normal disposition of a PCV valve, i.e. on or slightly downstream from the valve cover. The device includes a generally T-shaped body adapted for coupling at opposite sides thereof to a tube in part comprising the gaseous loop. A specific constructional arrangement which applies a magnetic field to the gaseous material passing through the body of the device includes a rod, a disc-shaped electromagnet attached at one end thereof and a permanent magnet in turn affixed to the electromagnet. Spaced from the magnets is an annular metal member. The gaseous materials flowing between the magnets and the annular member are subjected to a magnetic field which enables such gases to be more completely burned in the IC engine so as to both reduce the level of CO and NOₓ pollutants and to increase power output, thus increasing effective gas mileage.

6 Claims, 4 Drawing Figures

U.S. Patent
Jan. 5, 1982
4,308,847
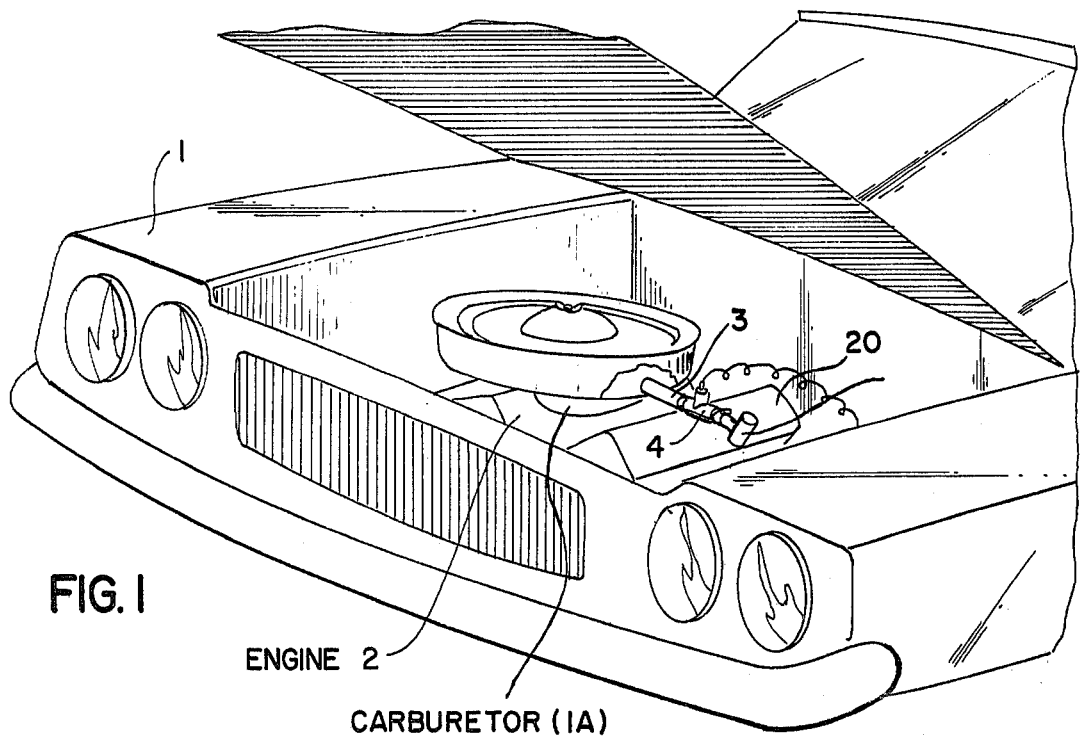
FIG. 1
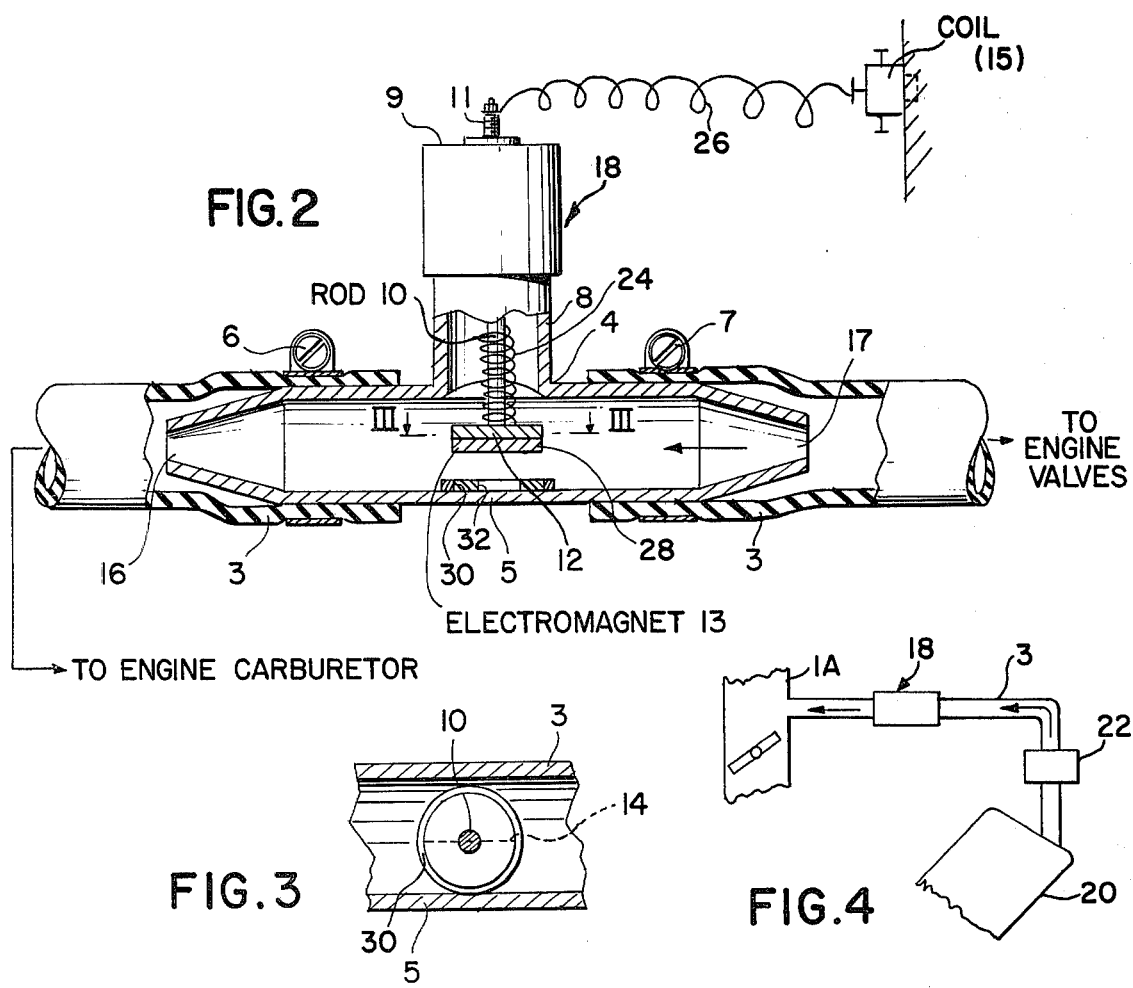
FIG. 2
FIG. 3
FIG. 4

COMBUSTION DEVICE FOR IC ENGINE

BACKGROUND AND SUMMARY OF THE INVENTION

This is a continuation-in-part of my application Ser. No. 863,787 filed Dec. 23, 1977, now abandoned.

The present invention relates to a improved combustion and anti-pollution device and more particularly to a device for use with a conventional modern IC engine as utilized in conjunction with automobiles and the like. Modern IC engines conventionally utilize a PCV valve which is conventionally disposed in a loop or line connecting the intake of the carburetor in essence to the crankcase of such engine. Such PCV valve is often mounted on top of the valve cover of such an engine and operates as a one-way valve such that crankcase blowby gases are effectively mixed with fresh air to form a combustion gas mixture which is first burned and then exhausted in the conventional manner. Many variations of such PCV valves have been constructed in order to attempt more complete combustion and improved performance for such engines. It has also been proposed to electromagnetically treat the incoming gaseous combustion mixture in an attempt to improve its combustion characteristics. Such proposal has been set forth in U.S. Pat. No. 3,989,017 issued Nov. 2, 1976 wherein the tube through which the combustion gases pass is provided with an electrical coil 80 or 81 positioned about the outer surface thereof. There remains, however, a need for a device which will improve combustion, lower resultant pollutants and achieve such while reducing gasoline usage.

It is accordingly an object of the present invention to provide an improved combustion and anti-pollution device of simple structure, which is inexpensive to manufacture, which can be installed with ease and convenience in both new and existing motor vehicles and which functions efficiently, effectively and reliably to reduce and/or effectively eliminate pollution in modern IC gasoline engines such that both federal and state pollution control regulations may be effectively met.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a perspective and partially schematic view of an IC engine mounted within an automobile and utilizing the device of the present invention;

FIG. 2 is an enlarged elevational view partly in section showing the preferred embodiment of the device of the present invention;

FIG. 3 is a sectional view taken along the line 3—3 of FIG. 2; and

FIG. 4 is a schematic view showing in particular the disposition of the device relative to the other operational portions of the invention.

DESCRIPTION OF THE INVENTION

The device 18 of the present invention is adapted for use primarily in an automobile vehicle 1 having a conventional IC engine 2. Such engine conventionally includes a carburetor 1A schematically shown in FIGS. 1 and 4 and both intake and exhaust valves (not shown) housed within a valve cover schematically shown by reference numeral 20 in both such figures. The engine includes a loop including tube 3 in which gases moving from the engine crankcase are effectively mixed with fresh air and gasoline to form a combustion mixture in the carburetor which mixture is then directed to the cylinders for combustion and exhaust in the conventional manner. Additionally, the system includes a PCV valve 22 which may be conventionally attached to the valve cover 20. Systems such as above partially disclosed and described are conventional and in this regard a more full disclosure thereof may be found in the following publication and particularly pages 10 through 15 thereof under the heading "Crankcase emissions": Glenns Emission Control Systems by Harold T. Glenn, published by Henry Regnery Company, Chicago, 1972, the disclosure of which is hereby specifically incorporated by reference into the subject application.

The device 18 includes a substantially T-shaped body 4 having an open head 5 including opposite ends thereof, interposed in the tube 3 between the carburetor 1A and the valve cover 20. This is readily accomplished by cutting the tube 3 which is generally formed of rubber, plastic and the like and fitting the opposite ends of the head 5 of the body 4 into the thus severed ends of the tube 3 and thereafter tightening the tube 3 around the opposite head ends by appropriate clamps 6 and 7. The body 4 includes a stem 8 extending substantially perpendicularly from the head 5 and extending outwardly from the tube 3. The stem 8 is closed at is free end 9.

An electrically conductive rod 10 preferably formed of steel and of one-quarter inch diameter is coaxially positioned in the stem 8 of the body 4 and included opposite first and second ends 11 and 12 respectively. The first end 11 of the rod 10 extends through the closed free end 9 of the stem 8. A disc-shaped electromagnet 13 is affixed to the second end 12 of the rod 10 and positioned perpendicularly to the rod with the diameter 14 thereof shown by broken lines in FIG. 3, coaxial with the head 5 of the body 4. The rod 10 is provided with a wrapped wire coil 24 preferably of 0.035 inch diameter copper wire provided with approximately 18 turns so as to effectively produce a resistance of about 8.2 ohms. The wire 24 is in turn connected to the first end 11 of the rod 10 which in turn is connected to any suitably source of electrical alternating current such as from the standard coil 15 of the engine. In this regard, a wire 26 serves to connect the ignition side of the coil 15 to the first end 11 of the rod 10.

In addition to the electromagnet 13 thus formed by the above-described construction, a permanent magnet 28 also essentially of disc form and preferably of the same approximate diameter as the electromagnet 13, that is, of one inch diameter and approximately one-eighth inch thickness is suitably attached to the electromagnet 13 generally in face to face contact therewith such that the permanent magnet 28 is disposed lowermost within the head 5 of the body 4. In this regard, it should also be brought out that the body 4 including the head 5 thereof is formed of a non-metallic generally non-electrical conducting material such as conventionally known engineering plastics including PVC and polyethelene.

In addition to the magnets 13 and 28 above referred to, the head 5 of the body 4 is additionally provided with an annular ring 30 also approximately of the same overall thickness and diameter as each of the electromagnets, that is, of approximate one inch diameter and one-eighth of an inch thick. The ring 30 includes an annular space 32 which is generally centered therein and of a diameter of approximately one-half inch. The ring 30 is formed of a magnetic material such as steel.

In operation, the gaseous mixture passing through the tube 3 in direction of the arrows in FIGS. 2 and 4 is subjected to a direct magnetic field which has the resultant effect of energizing the molecular particles in the gaseous stream. The level of electrical energy supplied to the rod 10 in the manner as above-described and utilizing a conventional 12 volt automobile electrical system is believed sufficient to in some way effect the molecular structure of the gaseous material passing through such field and including oxygen, nitrogen, carbon and the like so as to cause an excitation of such materials and perhaps a reduction of the double bond molecular affinity such materials have and in such a way that they may more easily combine with other elements so as to produce more complete combustion and improved mileage results that have been obtained by use of the present invention with conventional automobile IC engines of the type above-described.

While there is shown and described herein certain specific structures embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An improved combustion and anti-pollution device for disposition within a gaseous material loop connecting the crankcase and carburetor of an IC engine, said loop including a generally flexible hollow tube, said device comprising, a substantially T-shaped body having opposed head ends, said body interposed in said tube and positioned substantially coaxially with said tube, a stem extending substantially perpendicularly from said body and projecting out of said tube, said stem being closed at a free end thereof, an electrically conductive rod coaxially positioned in said stem and having opposite first and second ends, the first end of the rod extending through said closed free end of said stem, a disc-shaped electromagnet affixed to the second end of the rod and positioned perpendicularly to said rod and having a diameter thereof coaxial with the head of said body, a disc-shaped permanent magnet in turn attached to said electromagnet at the lower face thereof, an annular ring of magnetizable material positioned in said body between the head ends thereof and positioned in spaced opposition to the lowermost face of said permanent magnet, means for causing a flow of combustion gases in said tube whereby said gases pass through the space between said ring and said magnets, and electrical energy means electrically connected to the first end of the rod outside the body for supplying alternating electrical energy thereto thereby producing a magnetic field in said body for energizing gaseous molecules passing therethrough.

2. The device as claimed in claim 1, wherein the head of said body has spaced opposite free ends in the tube between the carburetor and the engine valves and tapers down at both said free ends.

3. The device of claim 1, said ring and said magnets each generally of the same approximate dimension.

4. The device of claim 3, said ring being of 1" diameter and having a ½" centered opening and about ⅛" thickness and formed of steel.

5. The device of claim 1, said electrical energy means being a wire of about 8.2 ohms and including about 18 turns about said rod.

6. The device of claim 4, said tube having a vertical height of about 1", said space between said magnets and said ring being about ½".

* * * * *